April 7, 1970 W. P. LEAR ET AL 3,505,486

MAGNETIC TAPE CARTRIDGE PLAYER WITH RADIO HAVING A COMMON AMPLIFIER AND SWITCHLESS INDEPENDENT OPERATION THERETHROUGH

Original Filed April 5, 1966 3 Sheets-Sheet 1

INVENTORS,
WILLIAM P. LEAR
SAMUEL H. AULD

BY Richard A. Mann
ATTORNEY.

April 7, 1970 W. P. LEAR ET AL 3,505,486

MAGNETIC TAPE CARTRIDGE PLAYER WITH RADIO HAVING A COMMON AMPLIFIER AND SWITCHLESS INDEPENDENT OPERATION THERETHROUGH

Original Filed April 5, 1966 3 Sheets-Sheet 2

INVENTORS,
WILLIAM P. LEAR
SAMUEL H. AULD

BY Richard A. Marsen
ATTORNEY

INVENTORS,
WILLIAM P. LEAR
SAMUEL H. AULD
BY
Richard A. Marsen
ATTORNEY.

United States Patent Office 3,505,486
Patented Apr. 7, 1970

3,505,486

MAGNETIC TAPE CARTRIDGE PLAYER WITH RADIO HAVING A COMMON AMPLIFIER AND SWITCHLESS INDEPENDENT OPERATION THERETHROUGH

William P. Lear, Wichita, Kans., and Samuel H. Auld, Bloomfield Hills, Mich., assignors to Lear Jet Industries, Inc., Wichita, Kans., a corporation of Delaware Original application Apr. 5, 1966, Ser. No. 540,289. Divided and this application Oct. 13, 1966, Ser. No. 586,420
Int. Cl. G11b *31/00, 23/18*
U.S. Cl. 179—100.11 6 Claims

ABSTRACT OF THE DISCLOSURE

A magnetic tape cartridge is transcribed in a player unit that contains a motor drive, a tape transport driven thereby, and a transducer. The player unit also contains a radio tuner-detector, and a common audio amplifier. The relatively low level signal output of the tape transducer is conductively connected to the amplifier, while the radio audio detector is coupled thereto through an impedance of higher magnitude than that of the transducer. Switching into the radio play or tape play modes is thereby effected without breaking the two audio circuits to the common output amplifier.

CROSS-REFERENCES TO RELATED CASES

This patent is a division of our Patent 3,478,973 for "Compact Player for Magnetic Tape Cartridges," that issued Nov. 18, 1969, Ser. No. 540,289 filed Apr. 5, 1966, and assigned to the same assignee.

The compact magnetic tape player hereof is readily combined with a radio tuner-detector unit into a module that fits behind the dashboard of an automobile. Tape or radio play mode may be effected directly by the degree of cartridge insertion, in the manner set-forth in our Patent No. 3,400,227 for "Combination Radio and Magnetic Cartridge Player" and assigned to the assignee hereof. Such direct play control is effected simply without distraction during automobile driving, or by a small child in home use models.

BACKGROUND OF THE INVENTION AND SUMMARY

The magnetic tape records are arranged in cartridges for self-contained ready handling and play. A cartridge is inserted for transcription in the tape player unit, whereupon the magnetic tape is transported past a transducer head in well-known manner. The transducer contains one or two pick-up coils to provide the audio signals upon said tape transcription. These pick-up coils are conductively connected to the audio output amplifier.

A relatively low signal level occurs at the audio signals of the coils, and thus no direct switching thereof is required herein for the player mode. A radio tuner-detector is incorporated with the player unit thereof, connected also to the common output amplifier and speaker system. The audio of the radio detector however, is coupled to the audio amplifier through resistors that have greater impedance than do the transducer coils. Thus, the low-level tape signals are coupled with negligible loss; and the radio output is sufficient to readily overcome the permanently connected coils. Output switching at the audio level between the radio and tape play modes is thus avoided, and no interference occurs despite their common coupling to the amplifier.

DESCRIPTION OF THE PREFERRED EMBODIMENT

Figure 1:
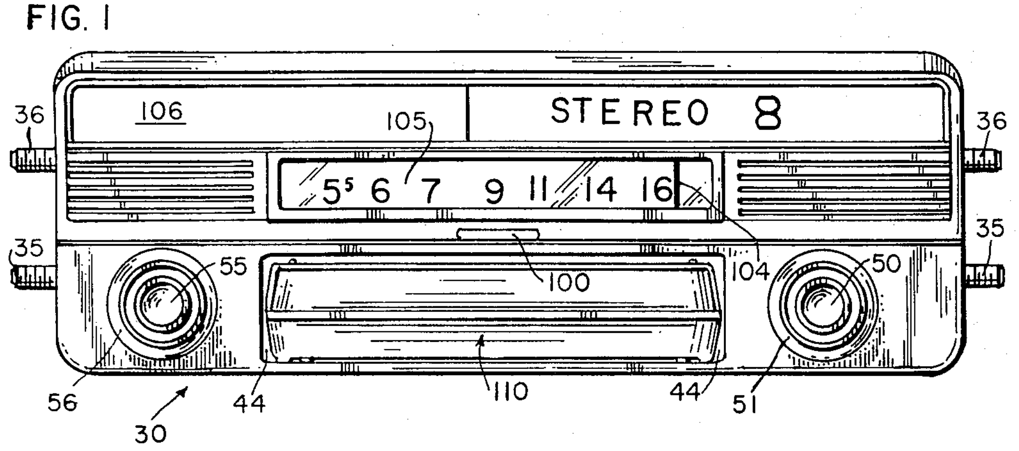
FIG. 1 is a front face view of the exemplary player, with a magnetic tape cartridge inserted therein.

The housing of the player 30 is composed of two half sections 31, 32 that are fastened together by machine screws or bolts at corner apertures 33, 33. The corner aperture regions are indented for this purpose, as shown at 34, 34 in FIG. 5. The sections 30, 31 are preferably rugged castings to afford suitable rigidity and reference platforms for stably supporting the player motor and mechanism in their precision transport and tracking of the magnetic tape 51 in a cartridge 50 inserted for play. The castings 31, 32 may be of aluminum or magnesium alloy to conserve weight. Two pairs of threaded studs 35, 36 extend centrally out of the sides of the player sections 31, 32. The stud sets 35, 36 are for securing the assembled player 30 onto a bracket 37, for adjustably mounting it in play position in a vehicle.

Figure 5:
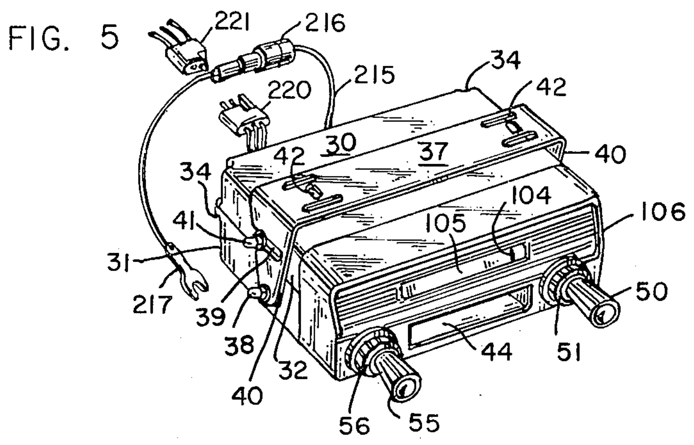
FIG. 5 is a perspective illustration of the exemplary player with a decorative front bezel and with a bracket for its underdashboard mounting.

FIG. 5 illustrates the under-the-dashboard mounting mode in an automobile. Threaded caps 38 attach tip apertures of U-bracket 37 onto lower studs 35. The player is pivoted on the lower studs 35. The proper angle setting, with the upper studs 36 coacting in arcuate slotted regions 39 of the arms 40, 40 of bracket 37. The caps 41 on upper studs 36 are then fastened against the arms 40 and sides of player 30 to hold it in play position, as desired. For floor mounting in a car, boat or airplane the bracket 37 is positioned upside down with the upper studs 36 becoming the pivots and the lower ones 35 determining the angle in the slots 39. The plurality of slots 42, 42 in the body of bracket 37 are for securement thereof to the corresponding portion of the vehicle at which the assembly is mounted for use.

The magnetic tape cartridge 50 is inserted in a slot or tunnel 44 therefor, extending into the player from its front. A radio tuner-detector unit 45 is incorporated with the exemplary player 30. It is transistorized and fitted in a longitudinal compartment 46 at the right side of partition 47 in base 31. The radio tuning of unit 45 is performed through shaft 48 that extends to front or central tuning knob 50. Circuitry for the radio tuner-detector, for clarity, is not shown, nor are those for the stereo amplifiers and motor control; the present invention not being concerned as to their details.

Figure 3:
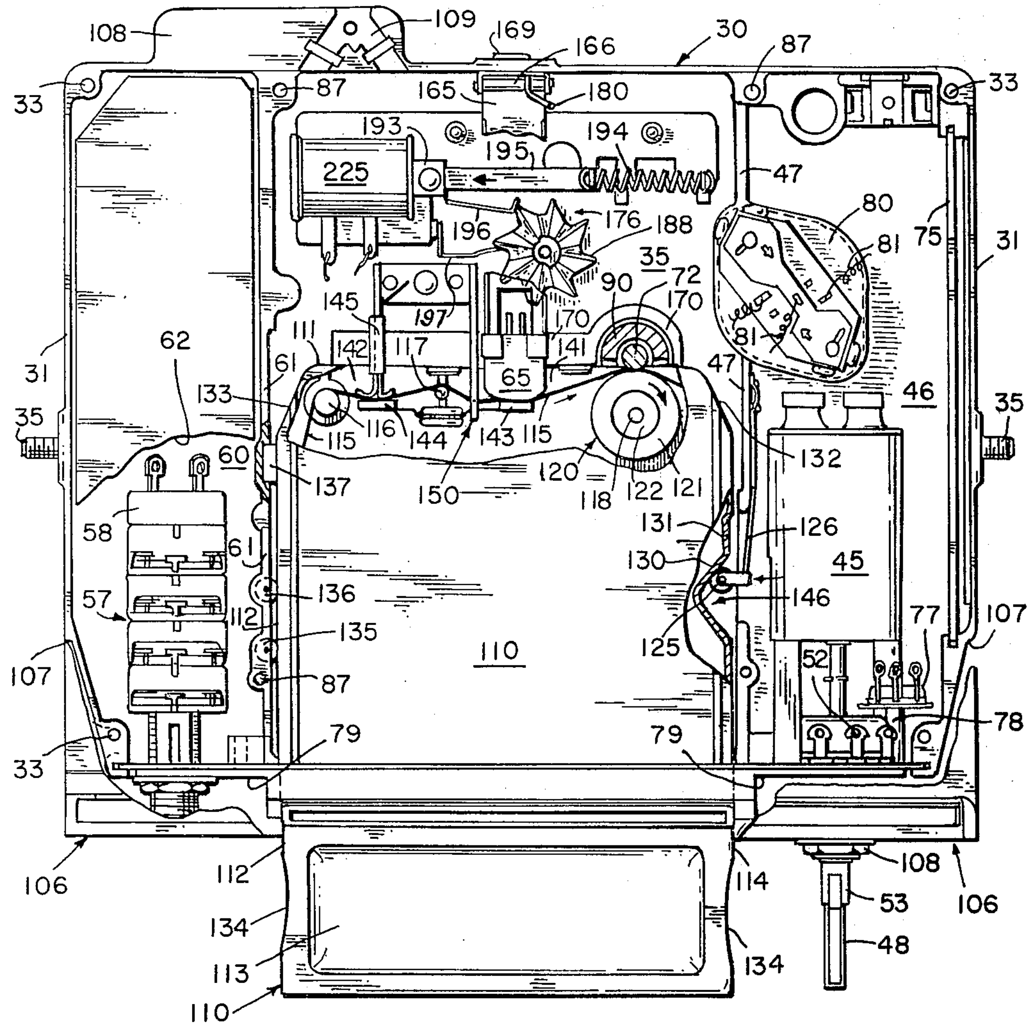
FIG. 3 is a plan view corresponding to FIG. 2 with the motor and other portions removed to show the interior mechanism and components, and their coaction with a cartridge inserted for tape play.

The balance control potentiometer 52 for stereophonic sound output control has a concentric sleeve 53 that is secured with the outer or back knob 51 (see FIGS. 3 and 25). Such knob array is of course optional. Clockwise rotation of knob 51 increases the right sound channel output while decreasing that on the left. Counterclockwise rotation will produce the opposite effect.

The set of control knobs 55, 56 at the left side are used herein as follows: The front or central knob 55 functions as the overall radio/player on-off switch, and volume setting. The outer or back knob 56 couples to a pair of potentiometers that effect tone control on both the stereo amplifier channels. This permits one to select the most pleasing tonal range for both the radio and tape playing. When it is turned clockwise the tone is more treble or brilliant. Turning knob 56 counterclockwise makes the tone more mellow and accentuates the bass tones.

A four-section potentiometer 57 (see FIG. 3) is used for the volume and tone control, in tandem for both stereo amplifiers. These are suitably ganged to the shaft and sleeve for control knobs 55, 56. At its rear section is the on-off electrical switch 58, above referred to. The exemplary dual stereo amplifier is a transistorized printed circuit array that is fitted within the longitudinal compartment 60 with ganged control 57, 58, at the left side of chassis base 31. Compartment 60 is defined by the left wall of base 31 and an interior wall 61. The compact stereo amplifier pair includes preamplification for the low-level magnetic head signal pickup of the tape record, and is diagrammatically indicated by its backboard 62 for simplicity of illustration. These amplifiers are shown schematically in circuital FIG. 4, at 63, 64. The dual magnetic (stereo) head is presented at 65, with individual tape channel pickup sections 66, 67.

Figure 4:
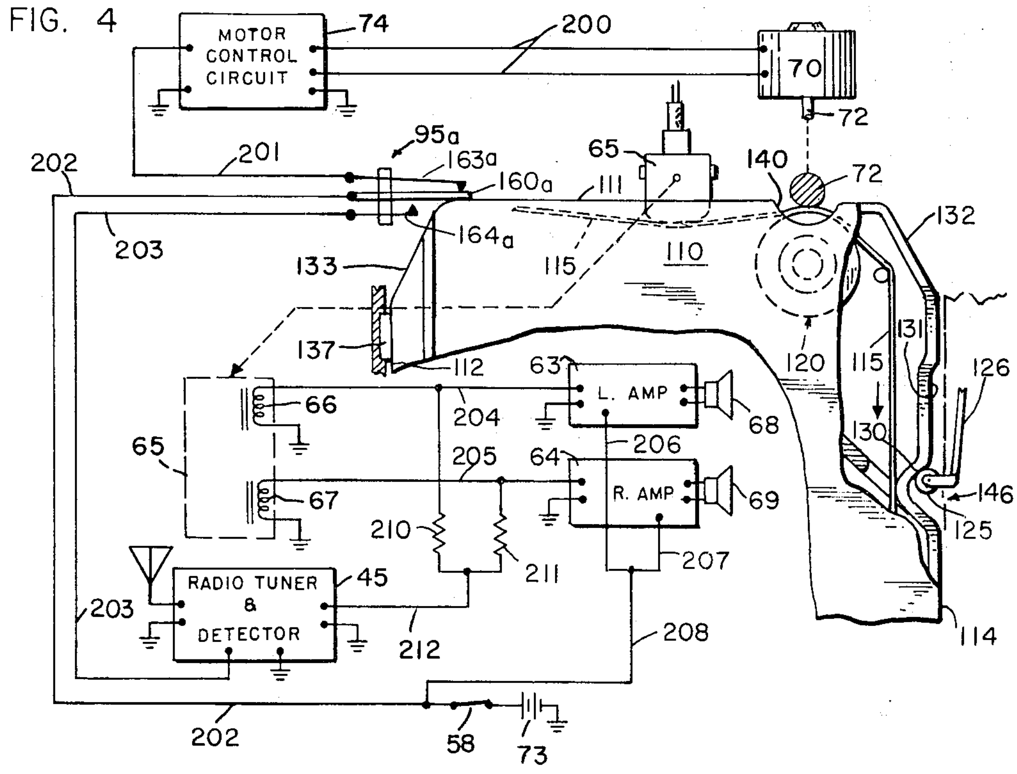
FIG. 4 is the overall schematic and block circuit diagram of the exemplary radio/tape player system.

The exemplary tape drive motor 70 is a low-voltage low-speed direct current permanent magnet type. Its rotor 71 is external and contains the predominate mass thereof to serve as a flywheel. Its central drive shaft 72 is the capstan for direct contact with and transport of the magnetic tape, see FIGS. 3, 18 and 19. The precise motor speed in r.p.m. is automatically controlled by an electronic motor control circuit energized by the vehicle low voltage source, as a twelve volt storage battery. The common battery 73 and speed control circuit 74 are indicated in FIG. 4.

Details of a direct current motor (as 70) are described in Patent 3,364,369 "Electric Motor Construction." A suitable practical motor control system (as 74) is set forth in Patent 3,396,323 "Electronic Motor Speed Control." It is to be understood that other drive systems may be used in the basic player hereof, as for example an alternating current motor with a separate flywheel, as for home-use models with an available 60 cycle source.

Most of the motor control circuit 74 is readily assembled on a compact printed-circuit-board, indicated at 75 (FIG. 3). Such board is held vertically along the right side of the player, by insertion in slots 76, 76 provided in base 31. A small potentiometer 77 has a forward projecting shaft 78 accessible through a small aperture in the front panel 79 for adjusting the speed of motor 70. The sizeable power transistor that directly controls the current through the motor in circuit 74, is mounted in a well 80 formed in the bottom of base 31 into the region 46, as seen in FIG. 3. This transistor (not shown) is mounted on the outside of base 31 for better ventilation, and suitably secured against the metal surface of well 80 that serves as a heat sink for circuital stability. Leads 81, 81 extend from the control transistor terminals into compartment 46 for connection in circuit 74.

The motor control circuit 74 regulates the motor speed to the predetermined r.p.m. for transporting the magnetic tape longitudinally past head 65, e.g. at 3.75 inches per second. Such motor speed is normally held substantially uniform over wide variation in ambient temperature or available battery voltage. Should the motor speed somehow be off noticeably, a stroboscopic pattern premarked on its flat top can directly ascertain this. Slight adjustment of the potentiometer 77, performed simply from the player front, is generally sufficient to synchronize the motor pattern, and its speed.

A central sub-chassis 85, as a stiff steel plate, is secured to base 31 by self-tapping screws 86, 86 into apertures 87, 87. Plate 85 mount the stator 88 of motor 70. A sleeve 90 is secured to the center of rotor 88. A cut-out in sleeve

90 provides access for the tape to the surface-roughened capstan thereat.

The motor 70 as a whole, including sleeve 90 and shaft 72, is thus mounted as a simple sub-assembly with a chassis plate 85. Its placement in the player is direct, sleeve 90 fitted into well 92 and the four screws 86, 86 securing plate 85 in proper position on base 31. This reduces production cost and service time. Its simplicity of parts and placement reduces cost and improves quality of the reproduced sound, with minimum wow and flutter and minimum wear and tear.

Figure 2:
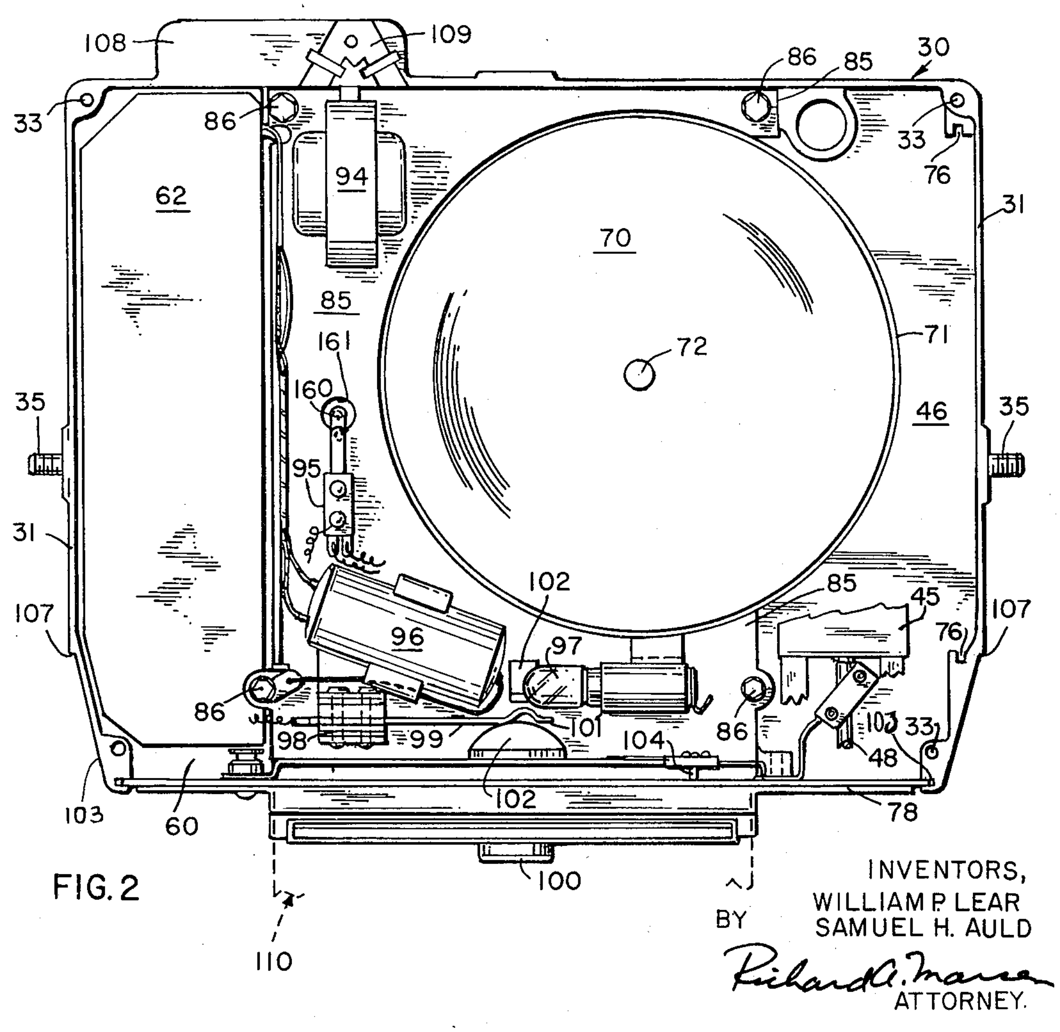
FIG. 2 is a plan view of the lower player section, with the upper section removed; the wiring being omitted for clarity.

Motor plate 85 carries thereon circuit transformer 94, cartridge operated radio/tape play-mode switch 95, electrolytic condenser 96, pilot light 97, and program or tape-track selector switch 98. The function and operation of play-mode select switch 95 is set forth hereinafter in connection with FIG. 3A. The program-select switch 98 comprises a leaf spring 99 that coacts with a push-button 100 slideably mounted centrally in front panel 78. The tip 101 of leaf spring 99 is arranged to normally press against the rear 102 of button 100 (FIG. 2). When the button is pressed inwardly, manually, tip 101 is displaced to contact grounded lug 102. A circuit is thereupon completed that energizes solenoid 225, to in turn effect the shifting of pick-up head 65 to the next stereo track pair or program position on the tape record.

The front panel 78 is a self contained sub-assembly that is inserted in vertical slots at the front corners 103, 103 of base 31, and companion ones in cover 32. When a radio tuner 45 is included in the player, a radio dial 105 is used. A movable pointer 104 is mechanically coupled to radio tuning shaft 48 controlled by knob 50 (not shown). Dial 105 is linear, parallel to cartridge tunnel 44, and placed above the tape cartridge position in the player. In this way one can view the radio tuning operation while a cartridge remains in player 30 in the "radio-play" position to be described.

A decorative front-cover or bezel 106 is readily combined with the player hereof. Its purpose is to enhance the appearance of the player, or permit ready change of design as viewed from the front. Bezel 106 may be inexpensively molded of tough plastic material, and coated with a metallic film to constitute a shiny player front. It is made to harmonize with the knobs.

Openings are provided to expose radio dial 105 and cartridge tunnel 44. An opening is also provided for the program select button 100 to project through, and an aperture for access to the motor speed control shaft 78. The bezel is hollow and proportioned to fit against vertical recesses 107, 107 in the side walls of base 31 and cover 32. The player sides are toed-in or tapered from recesses 107, 107. Bezel 106 is mounted against the player front by its having holes that fit over the front control shafts and sleeves when the knobs 50, 51 and 55, 56 are removed. The control shaft lock-nuts, or the knobs themselves, are positioned against bezel 106, holding it in position on the player at grooves or recesses 107, 107.

The exemplary cartridge 110 contains a reel of magnetic tape 115 therein, in endless array. A loop of the tape extends adjacent the forward end 111 thereof: about corner guide post 116, intermediate guide post 117, and pinch roller 120. The pinch roller hereof is rotatably supported on a fixed stud or post 118 of the cartridge housing, and contains a tire 121 of suitable elastic material as silicone, rubber or the like, concentric on its hub 122. More detailed description of cartridges similar to the one (110) hereof are set forth in Patent 3,403,868 "Magnetic Tape Cartridge System" assigned to the same assignee.

Tape cartridge 110 is inserted into player 30 at frontal slot or tunnel 44. FIG. 3 illustrates the cartridge fully inserted and firmly and stably held in the tape-play position. A retention roller 125 is arranged at the right side of the tunnel, biased inwardly towards the cartridge position by leaf spring 126, as indicated by the adjacent arrow. Roller 125 is held firmly pressed against the inclined wall 130 in the side of cartridge 110. The angle and location of wall 130 is arranged to establish a force component that presses pinch roller 120 against capstan 72 as well as a force component pressing the opposite cartridge side 112 firmly against side rollers 135, 136 and projecting member 137.

Rollers 135, 136 are mounted on respective vertical axes in partition wall 61; member 137 being affixed with wall 61. The rollers 135, 136 are preferably of solid self-lubricating material as "Teflon," "nylon," "Delrin." They materially facilitate the insertion and removal of the cartridge from the close fitting tunnel 44, and coact to stably holding the cartridge in a "floating" condition for smooth tape play in conjunction with the engaged retention roller 125 on inclined wall 130.

When cartridge 110 is fully inserted in the play mode shown in FIG. 3, it is engaged with capstan 72 as hereinabove described. The capstan presses on the tape 115 as exposed through a front opening at pinch roller 120. A further opening 141 admits pick-up head 65 to coact with the transported tape 115. A pressure pad 143 maintains the tape against the surface of head 65. A tape guide 150 mounted in the player adjacent head 65 is arranged to hold the tape firmly in a predetermined plane for head 65, and at a set level for precise tracking.

Another opening 142 at the cartridge front permits the insertion of sensing contactor 145 to establish continuous contact with the passing tape 115. Pressure pad 114 facilitates this. Two individual curved contact arms detect the passage of a conductive strip adhered to the endless tape at its record end/start position. A circuit is thereby closed to energize solenoid 225 and initiate the shift of head 65 to the next successive track playing position on tape 115 in a well-known manner.

Figure 3A:
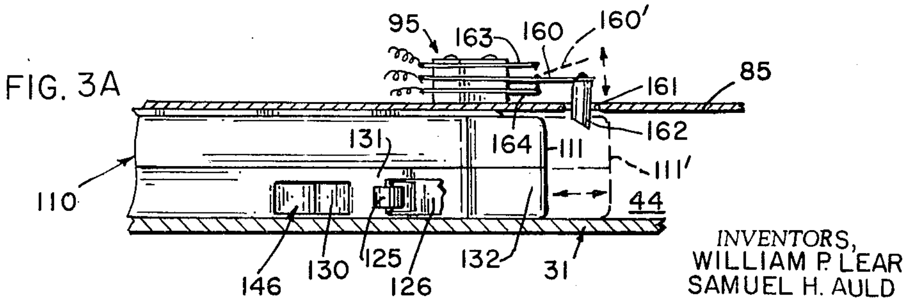
FIG. 3A is a diagrammatic illustration of the cartridge operated tape/radio play switch arrangement herein.

Upon the full insertion of the cartridge in the player, as shown in FIG. 3, the speed control circuit 74 for the drive motor 70 is directly activated to energize and operate the motor and its integral capstan 72. Towards this end, cartridge operated switch 95 is actuated, and the contained tape 115 is promptly transported for play by the capstan action. Switch 95, mounted above tunnel 44 on sub-chassis plate 85, has its central leaf-spring 160 extend over an aperture 161 in plate 85. A non-conducting pin 162 is fastened to the tip of leaf 160, and projects through the aperture into tunnel 44, as seen in FIG. 3A.

When cartridge 110 is fully seated, in forward abutment with capstan 72, its front end 111 is at the dashed line position 111'. Pin 162, which preferably has a slanted face, is thereupon moved upwardly by the cartridge. This results in leaf-spring 160 connecting with upper contact 163, in dash-line position 160'. This corresponds to the illustrated connection of switch **95*a* in tape-play mode FIG. 4. As set forth hereinafter, the motor control circuit 74 and motor 70 remain energized and operative-for-play while the play mode switch is thus closed by the tape-play position of the cartridge. It is of course understood that the master switch 58 is "on" through operation of knob 55 for either tape or radio to "play" under the control of cartridge actuated switch 95 or 95*a***.

When it is desired to change to radio-play the cartridge is withdrawn from the full-in tape-play mode by say ⅜" or ½". This action frees switch pin 162, which thereupon permits leaf-spring 160 to return to its normally closed position on lower contact 164. The contacts 160–163 are thereupon opened, the motor control circuit 74 deenergized, and the motor 70 stopped. Closure of contacts 160–164 completes the circuit energizing radio tuner and detector unit 45 which in turn plays through the amplifiers 63, 64 and speakers 68, 69, as described hereinafter in connection with FIG. 4. In the radio-play position of cartridge 110 detent roller 125 may repose in the shallow depression or secondary notch 131, further up side 114 nearer to ramp 132, or the cartridge fully withdrawn. Such cartridge operated selective radio/tape play system corresponds to that first described in our aforementioned Patent 3,400,227.

The player hereof is very well adapted and constructed to play tape records containing eight parallel individual recorded sound tracks on one-quarter inch wide tape. Such tracks each are of the order of 0.020" wide and necessarily closely spaced to fit on such tape width. The head is supported for play by the track positioning and shifting mechanism hereof for repetitive precision tracking and reproducing of the magnetically recorded sound. The two pick-up regions **65*a* of head 56 are spaced apart for stereo play whereby track numbers 1 and 5, 2 and 6, 3 and 7, 4 and 8** are paired for this purpose.

The tape record end/start region is sensed by contactor 145 as aforesaid, to directly actuate the track shifting operation to maintain continuity of play among the successive track pairs. For monaural eight-track recording, each parallel track is scanned and played in succession, as in the manner effected automatically in the copending patent application "Selective Stereo-Monaural Player" Ser. No. 522,514 filed Jan. 24, 1966, and assigned to the same assignee. A cartridge 110 4.0" x 5.5" x ⅞" in overall dimensions can readily contain a 400 foot reel of conventional lubricated ¼" magnetic tape for this purpose. Played at 3.75" per second, this produces a stereo program one hour and twenty minutes long; and a monaural one, of two hours and forty minutes. Such endless tape cartridges may be constructed as described in the copending Patent 3,403,868.

Head 65 is solidly attached to the end of a support beam 165. Support 165 is pivotally mounted to an upright edge 31" of base 31 through pin 166 carried in the arms 167, 167 of a bracket 168. Bracket 168 is pivotally secured to the base section.

Head support 165 contains a depending leg that is spring biased against the surface of step cam 176 and serves a cam follower. In the exemplary system step cam 176 has four discrete levels, to angularly displace head 65. Each cam level corresponds to the level of a track pair that is prerecorder on the tapes. Each successive cam step displaces and head 65 accordingly for progressive playing of the tape records. The steps of cam 176 are in circular array and arranged to cyclically repeat their successive head shifting action.

As briefly described hereinabove the motor control circuit is connected to motor 70 by leads 200. The dual section transducer or head 65 contains pick-up coils of sections 66 and 67 connected by leads 204, 205 to the individual amplifiers 63, 64 that in turn operate loud speakers 68, 69. The amplifiers 63, 64 are energized by battery 73 through leads 206, 207 and common connection 208 to main on-off switch 58. Radio/tape play mode switch **95*a* is similar to over-cartridge switch 95, except it is actuated by cartridge front 111. When it is in tape-play contact 160*a* connects to leaf 163*a*. This closes motor control energization input lead 201 with connection 202 to the battery 73, and results in motor 70 rotation at its predetermined speed, as aforesaid. Its capstan 72 transports tape 115 in the fully seated cartridge 110** as shown in FIG. 4.

When the cartridge is withdrawn, as about ⅜" or ½", its shallow forward notch 131 engages roller 125; switch arm **160*a* returns to its normally closed-on-lower-contact 164*a* condition; the motor circuit is deenergized and the motor stops; and battery connection 202 is completed on lead 203 to energize the radio tuner 45. With no tape record signal entering head 65, the radio program signals directly enter amplifiers 63, 64. Towards this end coupling resistors 210 and 211 are used to the amplifiers from common radio output lead 212. Thus both sets of stereo loud speakers 68, 69 play the radio output. Also, the impedance of resistors 210, 211 are made significantly greater than that of the head coils 66, 67 so that negligible signal power loss occurs during their relatively low signal level output during tape play. Conversely the much greater output level of radio unit 45 overcomes the impedance shunting by coils 66, 67**. Such connection minimizes switch change to effect the radio and tape modes herein.

The complete player 30 is illustrated in perspective in FIG. 5. Its compactness affords ready mounting in an automobile dashboard, or in other locations with bracket 37 as stated hereinabove. The front bezel 106 is an optional inexpensive decorative element. The battery lead 215 extends from the player as through a channel 109 in a ledge 108 formed in the rear of the player sections 31, 32 (see FIGS. 2, 3). A fuse and holder 216 is in cable 215 that has a terminal lug 217 for battery connection. The multispeaker cable also extends from inside the player and has a plug 220 for receptacle 221 that terminates the speaker system mounted in the vehicle. By placing say two speakers for each channel, one set on each side of the car occupants, stereophonic reproduction of the tape record is experienced, as the signal separation of the taped channels is excellent, as is their tracking hereof.

The player and its component sections has herein been set forth and described on an exemplary basis. It accordingly is to be understood that changes and variations thereof and therein may be made by those skilled in the art without departing from the broader spirit and scope of the invention therein.

What is claimed is:

1. In combination: a player for magnetic tape having transport means for the tape, motor drive means for operating said transport means and transducer means for scanning recordings on the tape; a radio tuner-detector unit; common amplifier means for said radio unit and tape player for selective operation therewith; the output of said transducer means being conductively connected to said amplifier means; impedance means electrically coupling the output of said radio unit to said amplifier means for independent play therethrough; and switching means for selectively energizing said radio unit and tape player into their operational mode; said impedance means having an impedance substantially higher than that of the output impedance of said transducer means to couple radio signals effectively to said amplifier means during the radio play mode, whereby the output of said amplifier means provides the programs thereby selected.

2. The radio-player combination as claimed in claim 1, in which said conductive connection is a low impedance connection from the transducer output to said amplifier means, and said impedance means is a resistance.

3. The radio-player combination as claimed in claim 2, in which said transducer means includes two individual pick-up coils arranged for stereo tape play, and said amplifier means includes an amplifier channel for each of the respective pick-up coils, the output of each said coil being conductively connected to its associated amplifier channel, said radio unit being coupled to each of said channels through said impedance means.

4. The radio-player combination as claimed in claim 1, in which said switching means comprises a two-positioned switch arranged for actuation by a tape cartridge operable in the player wherein said switch is actuated to energize said motor drive means into tape transport operation while the cartridge is in its play position in the player, and said switch is connected to energize said radio unit into operation while the switch remains unactuated by the cartridge.

5. A radio-player combination as claimed in claim 1, in which said transducer means includes two individual pick-up coils arranged for stereo tape play; said amplifier means comprising an individual amplifier channel conductively connected to the output of each said pick-up coil; said impedance means comprising two resistances, the audio signal output of said radio unit being respectively connected to said amplifier channels through said resistances; and an individual speaker connected to the output of each of said amplifier channels to provide stereophonic acoustic reproduction of the tape record when in play, and joint monaural reproduction of the radio signals when in the radio mode.

6. A radio-player combination as claimed in claim 5, in which the switching means comprises a two-positioned switch arranged for actuation by a cartridge containing the tape and operable in the player, wherein said switch is actuated into one position for energizing said motor drive means into tape transport operation while the cartridge is in its tape play position in the player, and said switch connects into its second position for energizing said radio unit into operation while the switch remains unactuated by the cartridge.

References Cited

UNITED STATES PATENTS

| | | | |
|---|---|---|---|
| 2,867,389 | 1/1959 | Viets | 179—100.2 X |
| 2,914,620 | 11/1959 | Dale | 179—100.2 |
| 2,941,737 | 6/1960 | Jones | 242—55.12 |
| 2,983,795 | 5/1961 | Tateishi et al. | 179—100.11 |
| 3,037,569 | 5/1962 | Rupp | 179—100.11 |

OTHER REFERENCES

Lear Jet Stereo 8 publication, dated Apr. 13, 1965, Lear Jet Corporation, Detroit, Mich.

BERNARD KONICK, Primary Examiner

R. F. CARDILLO, Jr., Assistant Examiner

U.S. Cl. X.R.

179—100.2